United States Patent
Gupta

[15] 3,659,293
[45] Apr. 25, 1972

[54] RANGE-DETECTING DOPPLER RADAR

[72] Inventor: Radha Raman Gupta, Southfield, Mich.
[73] Assignee: The Bendix Corporation
[22] Filed: June 2, 1970
[21] Appl. No.: 42,651

[52] U.S. Cl. ................................343/14, 343/8, 343/12 R, 343/17.5, 343/112 CA
[51] Int. Cl. ...........................................G01s 9/04
[58] Field of Search ..............................343/8, 12 R, 14, 17.5

[56] References Cited

UNITED STATES PATENTS 3,383,682  5/1968  Stephens.....................................343/8

Primary Examiner—T. H. Tubbesing
Attorney—William L. Anthony, Jr., Harness, Dickey and Pierce, William F. Thornton and Plante, Hartz, Smith & Thompson

[57] ABSTRACT

A Doppler radar for detecting range to a target having a single solid state device for generating microwave energy at time-shared first and second frequencies and for simultaneously mixing microwave energy reflected from the target with generated energy at each of the above frequencies to obtain a composite Doppler signal having two time-shared components in combination with a circuit for separating the two time-shared Doppler components from the composite signal, extrapolating the time-shared components to provide a pair of continuous component signals, and a phase comparator for providing a signal representative of the phase difference in the continuous component signals which represents the range to the target.

34 Claims, 6 Drawing Figures

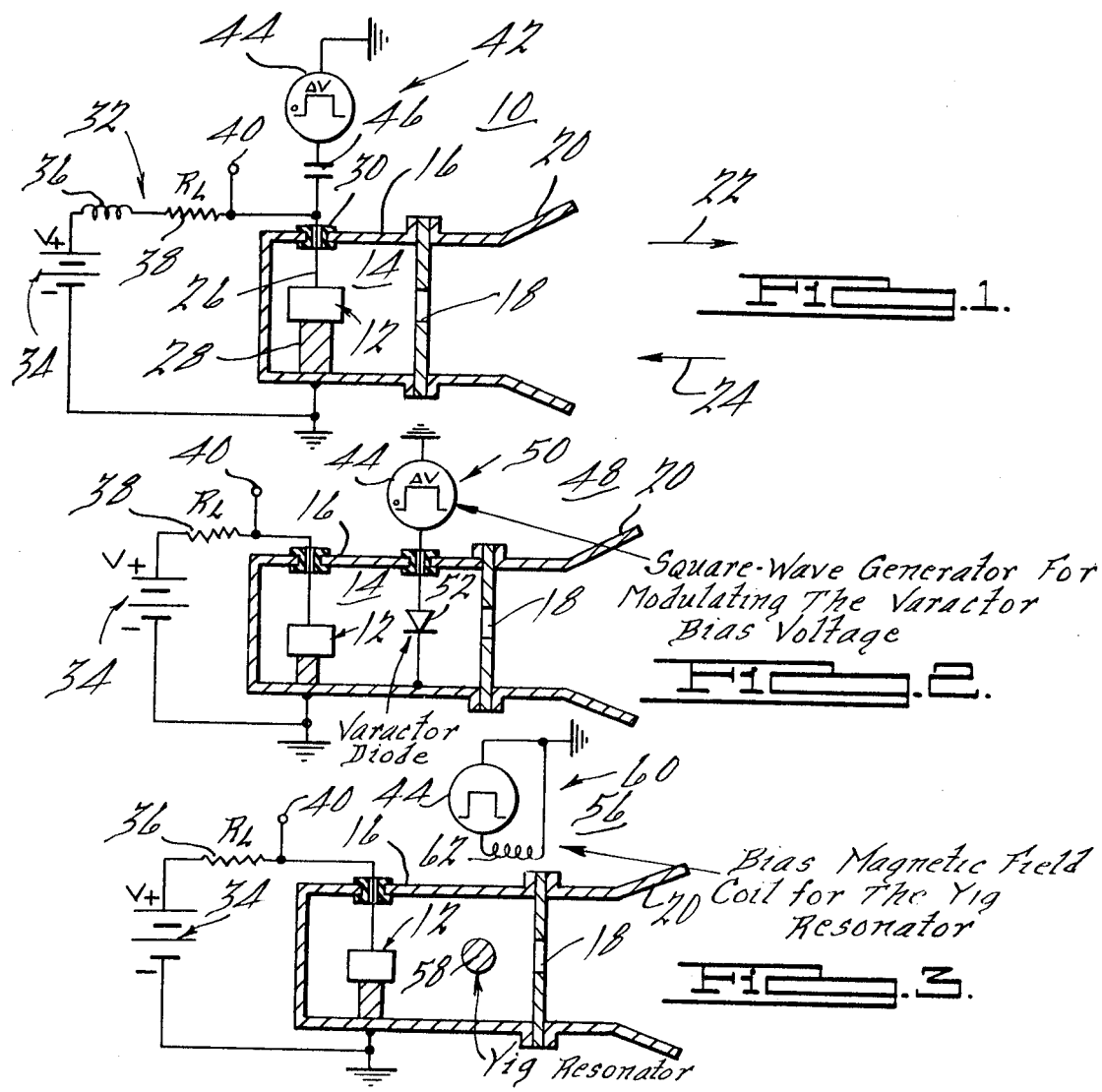
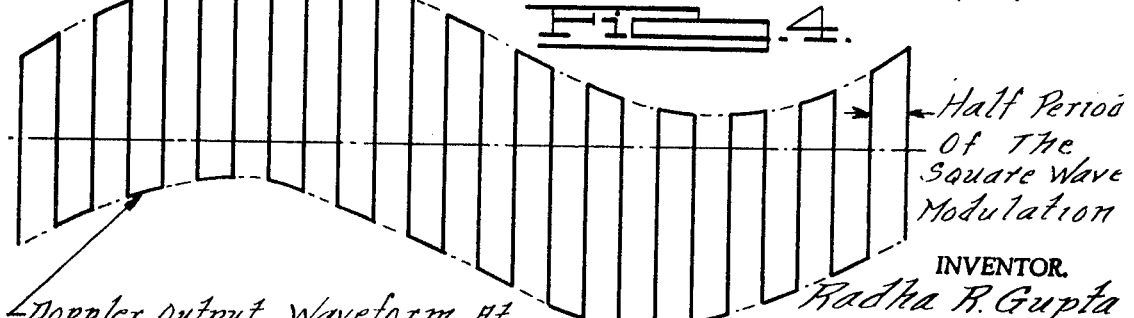

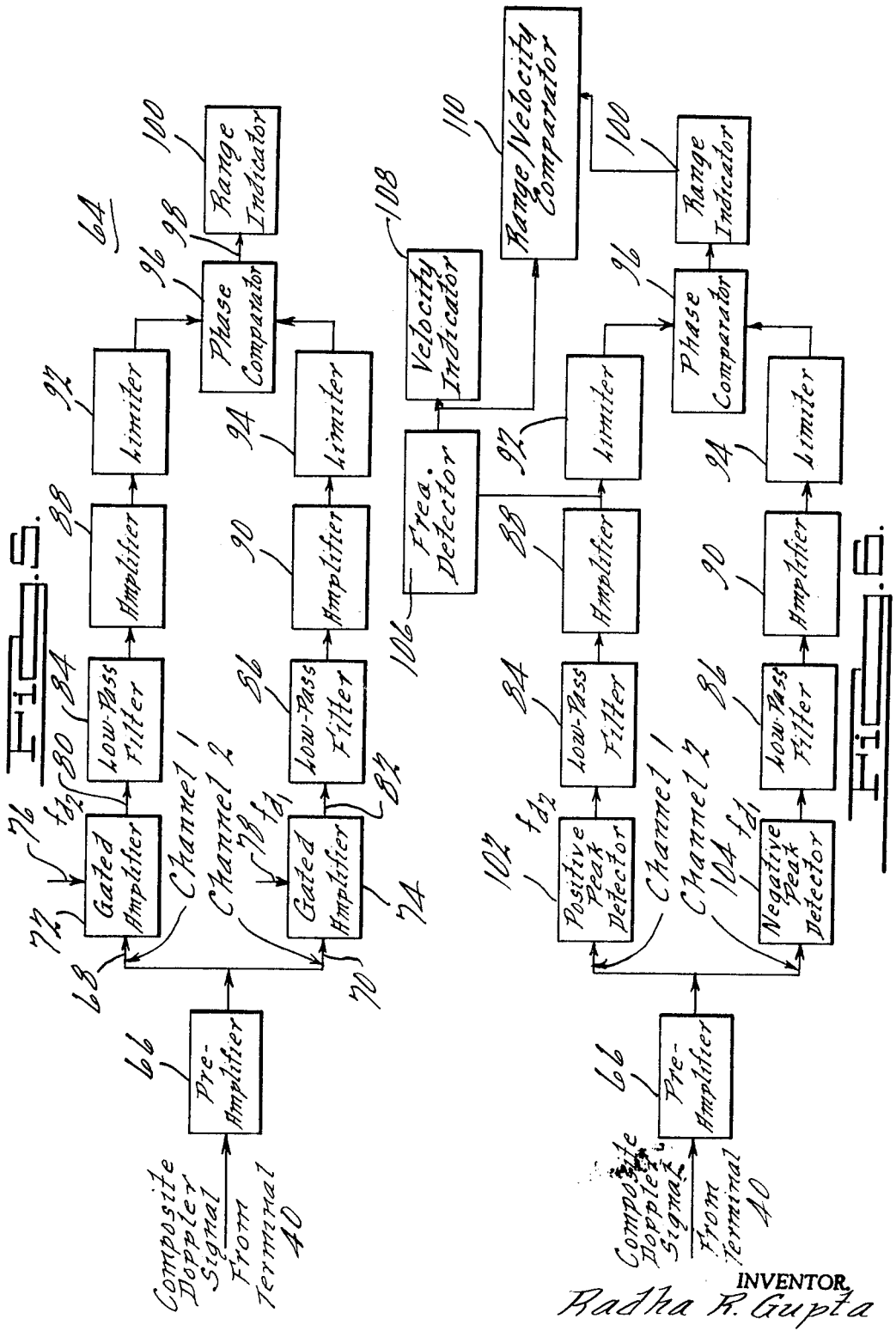

RANGE-DETECTING DOPPLER RADAR

BACKGROUND OF THE INVENTION

1. Field of the Invention

The present invention relates to Doppler radars, and more particularly, range-detecting Doppler radars.

2. Description of the Prior Art

Simple Doppler radars are known in the art wherein only a single solid state device is used to generate and simultaneously mix microwave energy so as to obtain a Doppler signal representative of the relative velocity of a target, for example, see the patent to Stephens Jr., U.S. Pat. No. 3,303,682. Ranging techniques for Doppler radars utilizing separate microwave generators and mixers are also known. In fact, there are a great number of illustrations in the prior art of techniques for measuring the range to a target which are used in conjunction with a Doppler radar system. Often the frequency of the transmitted microwave energy is shifted so as to affect a change in the Doppler signal which is representative of the range. One of the inherent problems in determining range using Doppler radars lies in the fact that an incoming signal of relatively low strength is to be mixed with, and in the vicinity of, an outgoing signal of considerable relative strength which, therefore, is quite capable of obscuring the reflected and Doppler signals. Moreover, the incoming signal must be processed so as to obtain subtly imbued range information. Accordingly, a significant degree of sophistication with regard to the microwave generator and mixer has been used in prior practice to assure proper mixing of the incoming signal as well as isolation from the microwave generator to yield range signals of reasonable accuracy and utility. To this end, the range-detecting Doppler radars of the prior art have painstakingly incorporated tuneable attenuators, isolating couplers, and isolating circulators between the generator and mixer to assure proper isolation and mixing. For example, see the system described in the article by Boyer entitled "A Diplex, Doppler Phase Comparison Radar," IEEE Transactions on Aerospace and Navigational Electronics, Mar., 1963, pages 27–33. These components, and consequently, these systems, are complex and costly. In fact, their cost prohibits their use in equipment for mass consumption such as automobiles and the like where they would be highly desirable, particularly, in a collision avoidance system. In this regard, although simple Doppler radars are available for detecting relative velocities, it will be appreciated that these alone are unsuitable for use in a collision avoidance system since the determinations of relative velocity, without range, is meaningless. For example, a high relative velocity between two vehicles where there is great separation is generally safe, whereas the same relative velocity at a lesser range may be highly dangerous. Doppler radar systems of the prior art which measure range have been too expensive to incorporate in automobile collision avoidance systems and thus, many lives have certainly been lost due to the shortcomings of the prior art devices.

SUMMARY OF THE INVENTION

The present invention provides a range-detecting Doppler radar utilizing a single solid state device which is not complex, uses inexpensive components, and may be economically manufactured. Most importantly, it is functionally and economically suitable for use in an automobile collision avoidance system. Accordingly, this invention is believed to be a significant advance in the art.

More specifically, an exemplary radar system according to the present invention includes a single solid state device, such as a Gunn, avalache or tunnel diode, or a transistor, which is adapted for electrical oscillation at microwave frequencies to generate microwave energy for transmission toward a target, and is further adapted to receive microwave energy reflected from the target and to simultaneously self-mix the reflected microwave energy with a portion of the generated microwave energy to obtain a Doppler signal. According to this invention, means are provided to modulate the frequency of the generated microwave energy, for example, by periodically shifting the frequency between first and second frequencies by modifying the bias voltage level of the device or by altering the RF impedance seen in the device. The reflected signal will correspondingly be shifted in frequency to provide a composite Doppler signal having time-shared components representative of the Doppler shift at each of the generated frequencies. The composite Doppler signals are then separated into the respective components (which are discontinuous or intermittent since they are time-shared) corresponding to the first and second frequencies, for example, by means of gated amplifiers synchronized with the signal used to shift the frequency of oscillation of the solid state device or by a pair of peak detectors. The separated discontinuous Doppler signal components are preferably extrapolated so as to provide continuous signals for convenient phase comparison. A phase comparator is provided to yield a signal representative of the phase difference between the two extrapolated components which is representative of range to the target. The Doppler shift at either or both frequencies may be directly used to indicate relative velocity of the vehicles, and the range signal may be used in combination therewith to determine if a dangerous ratio of relative velocity with respect to range exists.

In view of the foregoing description, the simplicity of construction and the consequent minimal cost of a range-detecting Doppler radar according to this invention will be apparent. As a result, a range-detecting Doppler radar system according to this invention may be produced which is economically suitable for use in a collision avoidance device for mass-production automobiles. Accordingly, the present invention may result in a significant reduction in automobile injuries and fatalities.

BRIEF DESCRIPTION OF THE DRAWINGS

FIG. 1 is an illustration of a first exemplary embodiment of a single element solid state device arranged and connected to provide a dual frequency microwave generator/mixer for use in a range detector according to this invention;

FIG. 2 is an illustration of a second exemplary embodiment of a single element solid state device arranged and connected to provide a dual frequency microwave generator/mixer for use in a range detector according to this invention;

FIG. 3 is an illustration of a third exemplary embodiment of a single element solid state device arranged and connected to provide a dual frequency microwave generator/mixer for use in a range detector according to this invention;

FIG. 4 is an illustration of a composite Doppler signal provided by the three exemplary embodiments of FIGS. 1–3;

FIG. 5 is a block diagram of a first exemplary embodiment of a system for processing the composite signal illustrated in FIG. 4 to yield an output signal representative of the range to a target; and FIG. 6 is a block diagram of a second exemplary embodiment of a system for processing the composite signal illustrated in FIG. 4 to yield an output signal representative of the range to a target.

DETAILED DESCRIPTION OF THE PREFERRED EMBODIMENTS

In FIG. 1, a first exemplary embodiment of a microwave generator/mixer 10 according to the present invention is illustrated. The generator/mixer 10 includes a single solid state device 12 mounted within a resonant cavity 14 provided by a housing 16. The cavity 14 is preferably rectangular but may also be of other form. The housing 16 has a side cover member including a centrally located port 18 which is preferably rectangular in form. If desired, the side cover member may be eliminated to provide a larger port. The port 18 communicates with a rectangular horn antenna 20 which is securably fixed to the housing 16 by bolts or other means (not shown) extending through abutting flanges. Those skilled in the art will appreciate that microwave energy generated within the resonant cavity 14 will pass through the port 18 and be directed in the direction of arrow 22. Moreover, microwave energy reflected from a target entering the horn antenna 20 as indicated by arrow 24 will be directed by the antenna 20 through the port 18 into the resonant cavity 14. Those skilled in the art will further appreciate that other means are available for electrically resonating at microwave frequency in association with the solid state device, extracting microwave energy from the resonator, for radiating the extracted microwave energy toward a target, for receiving reflected microwave energy from the target, and for delivering the reflected energy to the resonator. For example, a strip line or other conductor may be used to resonate in association with the solid state device and to transmit microwave energy to a dipole antenna which antenna and strip line may be used to receive and transmit microwave energy reflected from a target back to the solid state device. In fact, a large variety of such combinations are available and suitable for use with the present invention.

The single solid state device 12 preferably is a Gunn diode, the characteristics of which are well known in the art, and accordingly, a detailed discussion of its characteristics will not be presented here. For example, the Gunn diode can be a DX 1414A, DX 1717B or DX 2020C manufactured by Monsanto/Microwave Products, 800 North Lindbergh Boulevard, St. Louis, Missouri. Alternatively, the Gunn diode may be replaced by a tunnel diode, an avalanche diode, or a transistor. The basic characteristics which are required is that the device be capable of electrical oscillation in a frequency range providing transmittable electromagnetic energy, for example, in the microwave frequency range, and that the device have at least one non-linear parameter in that range such that the device will have a simultaneous self-mixing capability. In the case of diodes, a negative resistance characteristic may be utilized. A transistor may be used suitably for this purpose by connecting the transistor to a current providing oscillation in the microwave range and biasing the transistor for non-linear operation.

The Gunn diode 12 has an anode terminal 26 and a cathode terminal 28. The cathode terminal 28 preferably serves as a heat sink, and accordingly, is constructed of a large, thermally conductive metallic member which makes good thermal contact with the Gunn diode 12 and provides an efficient path for transfer of heat away from the Gunn diode 12. As can be seen in FIG. 1, the anode terminal 26 egresses the housing 16 by a suitable anode conductor and is electrically insulated therefrom by a capacitive insulating fitting 30. This capacitive insulating fitting 30 is designed to act as a short circuit for microwave energy. The anode terminal 26 is connected to a DC bias circuit 32 which includes a source 34 of DC potential at voltage V+, a high frequency choke (inductive coil) 36, a load resistance ($R_L$) 38 and an output terminal 40. The negative terminal of the source 34, the housing 16, and the cathode 28 of the diode 12 are each connected to ground as illustrated.

The microwave generator/mixer 10 also includes an apparatus 42 for modulating the frequency of oscillation of the Gunn diode 12, for example, by cyclically or periodically shifting the frequency of generated microwave energy from a first frequency $f_1$ to a second slightly higher frequency $f_2$. Preferably, microwave energy is generated continuously and the shifts between frequency are abrupt, i.e., in square wave fashion. In the embodiment of FIG. 1, the apparatus 42 for modulating the frequency of generated microwave energy includes a square wave voltage generator 44 switching from 0 voltage to $+ \Delta V$. The generator 44 is connected to the anode terminal 26 of the diode 12 through a DC blocking capacitor 46 which prevents the voltage source 34 from being shorted to ground. Accordingly, the bias voltage delivered to the anode of the Gunn diode 12 is switched between voltages $V_1$ and $V_2$ where $V_1$ is the bias voltage provided by the DC bias circuit 32 and $V_2$ is approximately $V_1 + \Delta V$. This switch of bias voltage induces a change in the frequency of oscillation of the Gunn diode 12 by correspondingly adjusting the quiescent operating point. More particularly, an increase in bias voltage provides an increase in frequency.

The inductance of the choke 36 is preselected such that a high impedance path through the DC bias circuit 32 is established to signals at the frequency of repetition of the pulses from the square wave generator 44. This is to assure that the predominant portion of the energy from the square wave generator 44 is delivered through the diode 12 rather than being dissipated in the voltage source 34 and the load resistor $R_L$ 38 (which have a lower combined DC impedance).

In an actual working embodiment of a microwave generator/mixer 10, the following components and values were used:
Gunn Diode Type - VSU 9203
Approximate power output from the Gunn Oscillator = 50 mw
Bias Voltage V+ ≈ 11 volts
Load Resistance ≈ 12 ohms
Voltage $\Delta V$ provided by square wave generator = approximately 0.25 volt
Repetition rate of Square wave generator = 100 KC/s.
Resonant Cavity Type - Rectangular
Horn Antenna Type - Pyramidal Horn (about 20 db gain)

In operation, the voltage V+ from the bias source 34 and the load resistance $R_L$ are preselected so as to bias the Gunn diode 12 in its negative resistance range. The Gunn diode 12 and the resonant cavity 14 are preselected to provide oscillations at microwave frequencies, and consequently, to cause the diode 12 to generate electromagnetic energy at microwave frequencies within the resonant cavity 14. The frequency of oscillation may be adjusted within limits, for example, by adjusting the voltage V+ or the resistance $R_L$. The microwave energy within the cavity 14 is isolated from the DC bias circuit 32 and the frequency modulating circuit 42 by capacitive interaction between the conductors thereof and the housing 16 where they pass through the housing 16. In other words, a capacitor is formed at each of the insulating fittings which shorts the microwave energy to the housing 16 yet permits signals at lower frequency levels, for example, the DC from the biasing circuit 32 and the square wave from the frequency modulating circuit 42, to pass relatively unimpeded.

With reference now to the apparatus 42 for modulating the frequency of the microwave energy generated by the microwave generator/mixer 10, it will be appreciated that the square wave generator 44 superimposes an additional voltage in step form on the anode 26 of the Gunn diode 12. The superimposed voltage step causes a shift in the quiescent operating condition of the Gunn diode 12 which correspondingly raises the frequency of oscillation of the Gunn diode 12. A portion of the resonant energy within the cavity 14 egresses through the port 18 and is directively transmitted or radiated by the horn antenna 20. Presuming now that a portion of the radiated energy emanating from the horn antenna 20 strikes a moving target or other object (now shown) so as to be reflected toward the horn antenna 20, it will be found that the reflected energy will differ in frequency in accordance with the relative rate of convergence or divergence of the target with respect to the horn antenna 20. The reflected energy alters the quiescent operating condition of the Gunn diode 12. More specifically, the voltage across the Gunn diode 12 and the current flow through the Gunn diode 12 is changed in accordance with the Doppler shift of the reflected signal. In essence, the generated frequency and the received Doppler-shifted frequency are mixed to generate a beat frequency equal to the Doppler shift. The variation in the bias current level through the Gunn diode 12 results in a potential change at terminal 40 which is used by the remainder of the exemplary Doppler radar range-detecting system of this invention to provide an output signal representative of range to the target, to be described in detail hereinafter.

Although there are several ways in which the mixing effect may be explained, it is believed that the predominant effect is due to receipt of the Doppler-shifted signal by the Gunn diode which induces voltages therein in accordance with the received signal frequency, the transmitted signal frequency, and the Doppler or mixed frequency (as well as harmonics or multiples of these frequencies). These voltages are generated by virtue of the non-linear resistance of the Gunn diode in the range in which it is operated. The ability of a non-linear device to mix signals at two frequencies and to provide a resultant signal having a frequency equal to the difference in the frequencies is well known and widely practiced in the radio art, for example, see "Radio Engineering" by Frederick E. Terman, McGraw-Hill Book Company, Inc. (1947), pages 535–539. Accordingly, a discussion of this operating principle will not be presented here. By virtue of the capacitive short for high frequencies at the insulating fittings and the inductance in the DC bias circuit, only the lower frequency signal, i.e., the Doppler signal, is allowed to pass through the load resistor $R_L$ so as to affect the voltage at the terminal 40. Therefore, the voltage at the terminal 40 will reflect only the mixed or Doppler signal induced across the Gunn diode 12.

In FIG. 2, another exemplary embodiment of a microwave generator/mixer is illustrated. In FIG. 2, components having functions like those shown in the embodiment of FIG. 1 are given like numerals. In the microwave generator/mixer 48 of FIG. 2, a frequency shifter or modulator 50 which is not directly associated with the DC bias circuit is utilized. The frequency modulating circuit 50 includes a square wave generator 44 which is operatively connected to a varactor diode 52. Modulation of the varactor diode voltage is effective to correspondingly change the capacitance thereof, and accordingly, the RF impedance seen by the Gunn diode 12. Varactor diodes and their properties are well known in the art, for example, see the article by I. Kuru entitled "Frequency Modulation Of The Gunn Oscillator" Proceedings of The IEEE, October, 1965, pages 1642 and 1643. Since the frequency of oscillation of the Gunn diode depends, in part, on the RF load impedance, the variation in the RF load impedance seen by the varactor diode is an effective means for varying the frequency of the transmitted microwave energy from $f_1$ to $f_2$. In the embodiment of FIG. 2, a high frequency choke in the bias circuit is not required since the bias circuit is separate from the square wave generator 44 of the frequency modulating circuit 50.

In FIG. 3, yet another exemplary embodiment of the microwave generator/mixer of the present invention is shown. In the microwave generator/mixer 56 of FIG. 3, the RF load impedance seen by the Gunn diode 12 is also varied to modulate the frequency of the generated microwave energy from frequency $f_1$ to frequency $f_2$. However, in the embodiment of FIG. 3, a Yig resonator 58 is inserted between the oscillator and antenna. A square wave modulated magnetic field generator 60 is provided which includes a square wave voltage generator 44 and a coil 62 being in sufficiently close proximity to the Yig resonator so as to be operative thereof. The resonant frequency of the Yig resonator 58, and hence the RF load impedance, is altered by the square wave modulated bias magnetic field for the Yig resonator 58. This effect is described in detail in the article by D. A. James entitled, "Wide-Range Electronic Tuning Of A Gunn Diode By An Yttrium-Iron Garnet (Y.I.G.) Ferrimagnetic Resonator" published in Electronics Letters, 18th Oct., 1968, Vol 4, No. 21, pages 451 and 452. In this embodiment, the housing 16 and the horn antenna 20 are preferably constructed of non-magnetic material so as to not interfere or short the magnetic field established by the magnetic field generator 60. Also, in this embodiment, a high frequency choke is not required in the biasing circuit since the square wave generator 44 of the frequency modulating circuit is separate from the biasing circuit.

In FIG. 4, a waveform is illustrated representative of the composite Doppler signal generated by the Gunn diode 12. To understand the formation of the composite Doppler signal, consider the previously described pair of signals representative of the transmitted microwave frequencies $f_1$ and $f_2$, the pair of Doppler-shifted received signals, and the pair of Doppler signals or difference signals appearing across the Gunn diode 12. The signals at microwave frequencies, i.e., the transmitted microwave signals at frequencies $f_1$ to $f_2$ and the received Doppler-shifted signals, are isolated within the resonant cavity 14 by virtue of the capacitive interaction between the anode conductor of the Gunn diode 12 and the housing 16. Accordingly, only the pair of Doppler signals $fd_1$ and $fd_2$, corresponding to frequencies $f_1$ and $f_2$, respectively, appear across the load resistance 38. The Doppler signals $fd_1$ and $fd_2$ are time-shared i.e., they occur successively. With reference now to FIG. 4, a signal waveform representative of the composite Doppler signal is illustrated as consisting of component Doppler signals $fd_1$ and $fd_2$. More specifically, the component Doppler signal $fd_1$ represents the frequency difference between the transmitted signal at frequency $f_1$ and the received Doppler-shifted signal corresponding to that transmitted signal; and the component Doppler signal $fd_2$ represents the frequency difference between the transmitted microwave signal at frequency $f_2$ and the received Doppler-shifted signal corresponding to that transmitted signal. Since the difference between the transmitted signal and the Doppler-shifted received signal is in accordance with the frequency of the transmitted signal, the component Doppler signal $fd_2$ will be at a higher frequency level than the component Doppler signal $fd_1$. Accordingly, the output on terminal 40 will shift between the frequency levels of the Doppler signals $fd_1$ and $fd_2$ at the same rate that the transmitted frequency shifts. The result is a somewhat square waveform having maximum and minimum portions of relatively gradual slop which constitute segmented or discontinuous representations of component Doppler frequencies $fd_1$ and $fd_2$, respectively. More specifically, the maximum or upper portions of the square waveform inscribe or outline a component Doppler signal $fd_2$, which, if extrapolated across the regions wherein the frequency transmitted is $f_1$, would yield a smooth sine wave signal of a given phase $0_1$ with respect to a selected reference. The lower portions of the square wave likewise may be extrapolated to provide a smooth sine waveform representative of the component Doppler signal $fd_1$ occurring during the transmission of frequency $f_1$. This signal may be defined in the terms its phase $0_2$ with respect to the above selected reference. Accordingly, the composite signal of FIG. 4 defines two component Doppler signals, one $(fd_1)$ corresponding to the transmission frequency $f_1$, and the other $(fd_2)$ corresponding to the transmission frequency $f_2$, each of the Doppler signals having a predetermined phase with respect to a selected reference, and consequently, a predetermined phase relationship with respect to each other. The phase difference $\Delta 0$ between the two Doppler signals is related to range to the target according to the following quotation:

$$\Delta 0 = 2 (f_2 - f_1) r/c$$

Where:

$r$ = range of the moving target $c$ = velocity

For derivation of the above formula, see the article by Boyer entitled "A Diplex, Doppler Phase Comparison Radar," published in IEEE Transactions On Aerospace and Navigational Electronics, Mar., 1963, pages 27–33. In view of the above relationship, it will be appreciated that the measurement of the phase difference $\Delta 0$ of the composite Doppler signals $fd_1$ and $fd_2$ is directly proportional to range, and accordingly, such measurement will yield a signal representative of range. Using the aforementioned components and values in the actual working embodiment, a frequency of oscillation of about 16,000 Mega hertz which was cyclically shifted by approximately 2.5 hertz upon application of the square wave yielded a phase difference between $fd_1$ and $fd_2$ of about 180° in response to a range of about 100 feet.

In FIG. 5, an exemplary signal processor is illustrated for the composite waveform of FIG. 4 which yields a signal representative of the phase difference $\Delta 0$ between the component Doppler signals $fd_1$ and $fd_2$, and accordingly, provides a signal which is representative of range to the target. In essence, the system of FIG. 5 separates the discontinuous component waveforms $fd_1$ and $fd_2$, extrapolates the separated signals across the regions at which the other frequency is being transmitted so as to form continuous signals $fd_1$ and $fd_2$, and measures the phase difference between the two separated, extrapolated Doppler signals $fd_1$ and $fd_2$.

More particularly, the signal processing system 64 of FIG. 5 has a preamplifier 66 receiving the composite Doppler signal from terminal 40 to provide an amplified composite Doppler signal at the input terminals 68 and 70 of gated amplifiers 72 and 74, respectively. The gated amplifiers 72 and 74 receive a gating signal on lines 76 and 78, respectively, from the square wave generator 44 which is operative to turn on gated amplifier 72 when the square wave voltage pulse from generator 44 is at zero and to turn on gated amplifier 74 when the square wave signal is at $+ \Delta$ V. Accordingly, the gated amplifier 72 will produce a signal at its output terminal 80 which is representative of the lower frequency portions $fd_1$ of the composite Doppler signal, and similarly, the gated amplifier 74 will produce an output signal at its output terminal 82 which is representative of the upper frequency portions $fd_2$ of the composite Doppler signal.

Fourier analysis of the signals from the gated amplifiers 72 and 74 reveals that the signal is composed of high frequency portions representative of the gating points of the composite signal and low frequency portions representative of the more gradually sloped portions of the signal which are representative of the respective Doppler signals $fd_1$ and $fd_2$. Low pass filters 84 and 86 are provided to transmit only the low frequency portions, and consequently, to remove the high frequency portions of the signals at the gating points. As a result, the low pass filters 84 and 86 provide continuous signals representative only of the gradually sloped portions of the Doppler waveform which, in essence, contribute an extrapolation of the waveforms across the portions thereof in which the other transmission frequency is being generated. More specifically, the resulting signal provided by the low pass filters 84 and 86 are sine wave signals having a frequency and phase equal to the frequency and phase of the respective Doppler signals $fd_1$ and $fd_2$. In other terms, the signals from the low pass filters 84 and 86 represent the upper and lower envelopes, respectively, of the composite signal of FIG. 4. These sine signals are amplified by the amplifiers 88 and 90, and in turn, are converted to a square waveform by limiters 92 and 94, respectively. The square waveforms are used to permit highly accurate and convenient phase comparison of the two Doppler signals. A phase comparator 96 receives the square wave signals representative of $fd_1$ and $fd_2$ from limiters 92 and 94, respectively, and provides a signal on output line 98 representative of the phase difference thereof, and consequently, representative of range to the target. For example, the output signal on line 98 from the phase comparator 96 may be an analog signal or a digital signal being indicative of the time interval between the leading positive-going edges of the square waves from the limiters 92 and 94. The form is a matter of choice and each of the components described herein could be readily implemented for operation in either analog or digital form. Since these components are well known in the art, a detailed description thereof will not be provided.

A range indicator 100 is provided to convert the signal from the phase comparator 96 into an audio or visual display of the range to the target. If desired, the signal from the phase comparator 96 may be used collaterally or exclusively by an automatic control system for a vehicle in which the range-detecting system is mounted.

In FIG. 6, another exemplary embodiment of a signal processing system suitable for use with this invention is shown. In FIG. 6, components having functions like those of FIG. 5 are given like numbers. The exemplary embodiment of FIG. 6 differs from the exemplary embodiment of FIG. 5 in that it uses positive and negative peak detectors 102 and 104 to separate the components of the composite signal of FIG. 4 into the discontinuous component Doppler signals $fd_1$ and $fd_2$, respectively. The positive and negative peak detectors 102 and 104 may comprise diodes which are connected in opposite polarity such that each will respond to only one of the respective peaks (upper or lower portions) of the composite signal of FIG. 4. In essence then, a diode may serve the function of the gated amplifiers of the embodiment of FIG. 5. Alternatively, the peak detectors 102 and 104 may be transistors which are suitably connected and biased to respond to only one of the respective portions, $fd_1$ or $fd_2$, of the composite waveform of FIG. 4. Therefore, it will be appreciated that the peak detectors 102 and 104 are "self-gating" in that they are responsive to the configuration of the composite waveform shown in FIG. 4. The remainder of the signal processing is in accordance with the description with respect to FIG. 5, and accordingly, a repetition of that description will not be given. However, the embodiment of FIG. 6 also includes means for indicating relative velocity between the antenna and the target, and a range/velocity comparator useful with a collision avoidance system. More specifically, a frequency detector 106 receives the output from an amplifier 88 (or amplifier 90) to provide a signal representative of relative velocity. A velocity indicator 108 receives the signal from the frequency detector 106 and provides a velocity reading. The velocity signal is transferred to a range/velocity comparator 110 which additionally receives a signal from the range indicator 100. The range/velocity comparator may operate a buzzer, other imminent-collision alarm, or a passenger-restraining air bag when a critical relationship between range/velocity is detected.

Although this invention has been described with respect to a radar for detecting the range to a moving target, i.e., one providing a Doppler shift, the range to a moving as well as a stationary target may also be determined by sine wave modulating the transmission frequency. The bias current and hence the output voltage at terminal 40 will then contain a beat frequency corresponding to the range to the target. More specifically, the beat frequency will represent the phase shift between the transmitted and received microwave signals which is in accordance with range to the target.

It will now be appreciated that the present invention provides a range-detecting Doppler radar utilizing a single solid state device which, accordingly, is not complex, and may be easily and economically manufactured. Most importantly, range-detecting systems according to this invention are sufficiently inexpensive so as to permit their use with mass consumption products, and particularly, on automobiles in a collision avoidance system. Consequently, the range-detecting Doppler radar system of this invention makes practical a safety feature which may result in the saving of many lives.

While it will be apparent that the teachings herein are well calculated to teach one skilled in the art the method of making the presently preferred embodiments of this invention, it will be appreciated that the invention is susceptible to modification, variation and change without departing from the proper scope or meaning of the subjoined claims.

What is claimed is:

1. A radar system for detecting range to a target comprising: single solid state means operatively connected so as to electrically oscillate and thereby generate transmittable electromagnetic energy, said means being operatively adaptable for transmission of said electromagnetic energy at said target and for receiving electromagnetic energy reflected from said target, said single solid state means mixing at least a portion of said generated energy and at least a portion of said reflected energy to provide a signal representative of a frequency difference therebetween; and means operatively associated with said single solid state means for modulating the frequency of oscillation of said single solid state means, said difference signal being changed due to said modulation in a manner representative of range to said target.

2. A radar system according to claim 1 wherein said single solid state means is a diode having an operating range in which said diode electrically oscillates and wherein said diode is biased in said range to provide said electrical oscillation.

3. A radar system according to claim 2 wherein said diode is a Gunn diode and said range is the negative resistance range thereof.

4. A radar system according to claim 2 wherein said diode is a tunnel diode and said range is the negative resistance range thereof.

5. A radar system according to claim 2 wherein said diode is an avalanche diode and said range is the negative resistance range thereof.

6. A radar system according to claim 1 wherein said single solid state means is a transistor operatively connected to electrically oscillated to provide said transmittable electromagnetic energy.

7. A radar system according to claim 1 wherein said solid state means is connected to a source of operating voltage and wherein said means for modulating said frequency of oscillation comprises means connected to said solid state means for modulating the operating voltage supplied thereto.

8. A radar system according to claim 1 wherein
said single solid state means is a diode having an anode terminal and a cathode terminal, said diode being characterized by having a negative resistance vs. voltage relationship between said terminals in a predetermined range of bias voltage across said terminals; and
said means for modulating said frequency of oscillation modulates the bias voltage across said terminals.

9. A radar system according to claim 1 wherein said means for modulating said frequency of oscillation comprises means for modulating the RF impedance seen by said single solid state means.

10. A radar system according to claim 9 wherein said means for modulating said RF impedance seen by said single solid state means is a varactor diode being operatively connected to a modulating source of supply potential for modulating the capacitance thereof, and positioned with respect to said single solid state means such that said modulation of said capacitance is effective to modulate said RF impedance seen by said single solid state means.

11. A radar system according to claim 9 wherein said means for modulating said RF impedance seen by said single solid state means is a Yig resonator operatively associated with a source of modulating magnetic flux for modulating the resonant frequency thereof, and positioned with respect to said single solid state means such that said modulation of said resonant frequency is effective to modulate said RF impedance seen by said single solid state means.

12. A radar system according to claim 1 further including means for detecting said change in said difference signals for providing a signal representative of range to said target.

13. A radar system according to claim 1 wherein said means for modulating the frequency of oscillation of said single solid state means shifts the frequency of oscillation from a first frequency of to a second frequency in a periodic manner.

14. A radar system according to claim 13 wherein said shift from said first frequency to said second frequency is substantially abrupt so as to form a substantially square frequency-waveform.

15. A radar system according to claim 14 further including means for detecting said change in said difference signal comprising means for providing a difference signal corresponding to said first frequency and a difference signal corresponding to said second frequency, and means for phase comparison of said first and second frequencies difference signals so as to provide a signal representative of the phase difference thereof being representative of said range to said target.

16. A radar system for detecting range to a target comprising: housing means providing a resonant cavity;
a single solid state device located in said cavity being adapted to be connected to a source of electrical energy suitable for causing said device to electrically oscillate in the microwave frequency range so as to thereby generate microwave energy in said cavity;
antenna means operatively associated with said single solid state device for radiating said microwave energy and for receiving microwave energy reflected from said target such that at least one operating condition of said solid state device is affected by the difference in frequency between said received microwave energy and said generated microwave energy;
means operatively associated with said single solid state device for modulating the frequency of oscillation of said single solid state device so as to affect a change in said affected operating condition; and
means for detecting said change in said affected operating condition of said single solid state device so as to provide a signal representative of range to said target.

17. A radar system according to claim 16 wherein said single solid state means is a diode having an operating range in which said diode electrically oscillates and wherein said diode is biased in said range to provide said electrical oscillation and said affected operation condition is current flow through said diode.

18. A radar system according to claim 17 wherein said diode is a Gunn diode and said range is the negative resistance range thereof.

19. A radar system according to claim 17 wherein said diode is a tunnel diode and said range is the negative resistance range thereof.

20. A radar system according to claim 17 wherein said diode is an avalanche diode and said range is the negative resistance range thereof.

21. A radar system according to claim 16 wherein said single solid state means is a transistor operatively connected to electrically oscillate to provide said microwave energy.

22. A radar system according to claim 16 wherein said solid state means is connected to a source of operating voltage and wherein said means for modulating said frequency of oscillation comprises means connected to said solid state means for modulating the operating voltage supplied thereto.

23. A radar system according to claim 16 wherein
said single solid state means is a diode having an anode terminal and a cathode terminal, said diode being characterized by having a negative resistance vs. voltage relationship between said terminals in a predetermined range of bias voltage across said terminals; and
said means for modulating said frequency of oscillation modulates the bias voltage across said terminals, said affected operating condition being the current flow between said terminals.

24. A radar system according to claim 16 wherein said means for modulating said frequency of oscillation comprises means for modulating the RF impedance seen by said single solid state means.

25. A radar system according to claim 24 wherein said means for modulating said RF impedance seen by said single solid state means is a varactor diode being operatively connected to a modulating source of supply potential for modulating the capacitance thereof, and positioned with respect to said single solid state means such that said modulation of said capacitance is effective to modulate said RF impedance seen by said single solid state means.

26. A radar system according to claim 24 wherein said means for modulating said RF impedance seen by said single solid state means is a Yig resonator operatively associated with a source of modulating magnetic flux for modulating the resonant frequency thereof, and positioned with respect to said single solid state means such that said modulation of said resonant frequency is effective to modulate said RF impedance seen by said single solid state means.

27. A radar system according to claim 16 wherein said means for modulating the frequency of oscillation of said single solid state means shifts the frequency of oscillation from a first frequency to a second frequency in a periodic manner.

28. A radar system according to claim 27 wherein said shift from said first frequency to said second frequency is substantially abrupt so as to form a substantially square frequency-waveform.

29. A radar system according to claim 28 wherein said detecting means includes first means responsive to said affected operating condition when it is representative of the difference between said generated signal at said first frequency and said received signal corresponding to said first frequency for providing a first signal representative of said difference, and second means responsive to said affected operating condition when it is representative of the difference between said generated signal at said second frequency and said received signal corresponding to said second frequency for providing a second signal representative of said difference, and means for comparing the relative phases of said first and second difference signals so as to provide a signal representative of the phase difference thereof being representative of said range to said target.

30. A radar system according to claim 29 further including means for extrapolating said first and second difference signals so as to provide a pair of first and second continuous difference signals.

31. A radar system according to claim 30 wherein said means for extrapolating said first and second difference signals is a pair of low frequency filters, each receiving one of said first and second difference signals.

32. A radar system according to claim 31 further including limiting means for converting said first and second continuous difference signals into square waveforms prior to phase comparison thereof.

33. A radar system according to claim 29 wherein said first and second means are each a gating amplifier, one being synchronized to the occurrence of one of said first and second frequencies and the other being synchronized to the other of said first and second frequencies such that said one gating amplifier provides a signal representative of said affected operating condition during the generation of said first frequency and said other gating amplifier provides a signal representative of said affected operating condition during the generation of said second frequency.

34. A radar system according to claim 29 wherein said affected condition has a first polarity when it is representative of the difference between said generated signal at said first frequency and said received signal corresponding to said first frequency, and having a second polarity when it is representative of the difference between said generated signal at said second frequency and said received signal corresponding to said second frequency, and wherein said first and second means are each a polarity peak detector, one being connected so as to respond only to said first polarity and the other being connected to respond only to said second polarity such that said one peak detector provides a signal representative of said affected operating condition during the generation of said first frequency and said other peak detector provides a signal representative of said affected operating condition during the generation of said second frequency.

* * * * *